(12) United States Patent
Kobayashi et al.

(10) Patent No.: US 6,721,130 B2
(45) Date of Patent: Apr. 13, 2004

(54) THIN-FILM MAGNETIC HEAD HAVING THIN COIL-LAYER AND METHOD FOR MANUFACTURING THE THIN-FILM MAGNETIC HEAD

(75) Inventors: Kiyoshi Kobayashi, Niigata-ken (JP); Hideki Gochou, Niigata-ken (JP); Hisayuki Yazawa, Niigata-ken (JP); Toru Takahashi, Niigata-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 135 days.

(21) Appl. No.: 09/977,723

(22) Filed: Oct. 15, 2001

(65) Prior Publication Data

US 2002/0044379 A1 Apr. 18, 2002

(30) Foreign Application Priority Data

Oct. 16, 2000 (JP) .......................... 2000-319615

(51) Int. Cl.[7] .............................. G11B 5/17; G11B 5/147
(52) U.S. Cl. ........................................ 360/123; 360/126
(58) Field of Search ................................ 360/125, 126, 360/123, 317

(56) References Cited

U.S. PATENT DOCUMENTS

| 5,875,080 A | * | 2/1999 | Seagle .................. 360/123 |
| 6,130,805 A | | 10/2000 | Sasaki et al. |
| 6,163,436 A | | 12/2000 | Sasaki et al. |
| 6,178,070 B1 | | 1/2001 | Hong et al. |
| 6,185,068 B1 | * | 2/2001 | Fujita et al. ............ 360/123 |
| 6,483,665 B1 | * | 11/2002 | Sasaki .................. 360/126 |

FOREIGN PATENT DOCUMENTS

JP          06-176318     *  6/1994

* cited by examiner

*Primary Examiner*—George J. Letscher
(74) *Attorney, Agent, or Firm*—Brinks Hofer Gilson & Lione

(57) ABSTRACT

A thin-film magnetic head includes a first coil layer disposed at a lower core layer side of the interface between an upper core layer and an upper magnetic-pole layer, which are joined to each other, and a second coil layer disposed at the upper core layer side of the interface between the upper core layer and the upper magnetic-pole layer. The thickness of a coil conductor of the first coil layer is set smaller than the thickness of a coil conductor of the second coil layer.

13 Claims, 10 Drawing Sheets

THIN-FILM MAGNETIC HEAD HAVING THIN COIL-LAYER AND METHOD FOR MANUFACTURING THE THIN-FILM MAGNETIC HEAD

BACKGROUND OF THE INVENTION

1. Field of the Invention

The present invention relates to thin-film magnetic heads that are used for magnetic recording of, for example, magnetic hard discs. In particular, the present invention relates to a thin-film magnetic head which meets requirements for high recording density and frequency, and a method for manufacturing the thin-film magnetic head.

2. Description of the Related Art

A known thin-film magnetic head is formed on a substantially rectangular slider 61 made of a nonmagnetic material, as shown in FIG. 1. In FIG. 20, a recording head of the known thin-film magnetic head is formed such that first and second coil layers 59 and 60, which have a laminated structure in two layers, are disposed between an upper core layer 56 and a lower core layer 57 opposing each other.

In FIG. 20, an upper magnetic-pole layer 63 and a lower magnetic-pole layer 51 sandwich a magnetic gap layer 62, the upper magnetic-pole layer 63 and the lower magnetic-pole layer 51 being disposed at ends of the upper core layer 56 and the lower core layer 57, respectively, and magnetically connected thereto.

The first coil layer 59 is disposed toward the lower core layer 57 from a reference plane S5, which is the interface where the upper magnetic layer 63 and the upper core layer 56 are joined to each other. The first coil layer 59 is covered with an insulation layer 64 of which a surface is disposed at the reference plane S5.

The second coil layer 60 is formed on the surface of the insulation layer 64 which is disposed at the reference plane S5.

Width and thickness of a coil conductor of the second coil layer 60 equal the width and thickness of the coil conductor of the first coil layer 59, respectively.

A first organic insulation-layer 58 covers the second coil layer 60 and forms an inclined face 58a toward a magnetic-disc-opposing face 61b of the slider 61. The inclined face 58a of the first organic insulation-layer 58 gradually separates from the magnetic-disc-opposing face 61b along the inclination in a film-thickness direction from the reference plane S5.

The upper core layer 56 covers the second coil layer 60 with the first organic insulation layer 58 therebetween. An end of the upper core layer 56 extends from the inclined face 58a of the first organic insulation layer 58 to an upper face of the upper magnetic-pole layer 63.

The upper core layer 56 is formed, as shown in FIG. 21, such that a conductive primary coat 70 for plating is deposited by sputtering on the first organic insulation layer 58, the primary coat 70 is coated with a resist 71, and the resist 71 is formed by photolithography into a resist frame corresponding to the shape of the upper core layer 56.

In an exposure step of photolithography for forming the resist frame, exposure light is irregularly reflected at the primary coat 70 deposited on the inclined face 58a of the first organic insulation layer 58.

When an angle formed between the inclined face 58a of the first organic insulation-layer 58 and the reference plane S5 is large, a major part of the irregularly reflected exposure light leaks toward the magnetic-disc-opposing face 61b, whereby there is a risk in that portions of the resist 71 which must be shielded are exposed.

When the angle formed between the inclined face 58a of the first organic insulation-layer 58 and the reference plane S5 is large, the resist frame cannot be formed in a shape as it is designed, and it is difficult to form the upper core layer 56 correctly in desired position and shape.

When the angle formed between the inclined face 58a of the first organic insulation-layer 58 and the reference plane S5 is large, the thickness of the first organic insulation-layer 58 is significantly reduced at corners at the outer and inner peripheries of the second coil layer 60, whereby there is a risk of a short circuit between the second coil layer 60 and the upper core layer 56. When the distance between the second coil layer 60 and the upper core layer 56 is increased without changing the shape of the second coil layer 60 in order to avoid short circuit between the second coil layer 60 and the upper core layer 56, the length of a magnetic path in the upper core layer 56 is increased; therefore, it is difficult to cope with high-frequency recording.

In the known thin-film magnetic head, the thickness of a coil conductor of the first coil layer 59 equals the thickness of the coil conductor of the second coil layer 60. Therefore, when the coil conductor of the second coil layer 60 is thick, the coil conductor of the first coil layer 59 becomes also thick. In this case, when the insulation layer 64 covering the first coil layer 59 is thin, there is a risk in that the first coil layer 59 is exposed from the insulation layer 64, whereby there is a risk in that a short circuit occurs between the first coil layer 59 and the second coil layer 60.

SUMMARY OF THE INVENTION

Accordingly, it is an object of the present invention to provide a reliable thin-film magnetic head.

The thin-film magnetic head of the present invention comprises a lower core layer; an upper core layer opposing the lower core layer; an upper magnetic-pole layer disposed between the upper core layer and the lower core layer and joined to the upper core layer; a magnetic gap layer disposed between the upper magnetic-pole layer and the lower core layer; a first coil layer disposed at the lower core layer side of an interface between the upper core layer and the upper magnetic-pole layer, which are joined to each other; and a second coil layer disposed at the upper core layer side of the interface. The thickness of a coil conductor of the first coil layer is smaller than the thickness of a coil conductor of the second coil layer.

With this arrangement, the first coil layer can be formed at a sufficiently large distance from the interface between the upper magnetic-pole layer and the upper core layer by reducing the thickness of the coil conductor of the first coil layer, whereby a reliable thin-film magnetic head is obtainable, in which insulation between the first and second coil layers is ensured. In the thin-film magnetic head according to the present invention, the interface between the upper magnetic-pole layer and the upper core layer can be lowered because the first coil layer is disposed at a sufficiently large distance from the interface, whereby the thickness of the upper magnetic-pole layer can be reduced. By reducing the thickness of the upper magnetic-pole layer, magnetic fluxes can flow efficiently from the upper core layer to the magnetic gap layer; therefore, the thin-film magnetic head can cope with high recording density.

The width of the coil conductor of the second coil layer may be smaller than the width of the coil conductor of the first coil layer.

By increasing the thickness and reducing the width of the coil conductor of the second coil layer, a proper number of windings can be provided in a reduced area without increasing DC resistance in the coil conductor. Therefore, the length of the upper core layer from a part of the second coil layer in the vicinity of a coil center thereof to the periphery of the second coil layer can be reduced, whereby the length of a magnetic path is reduced, thereby providing a thin-film magnetic head having low inductance and capable of high-frequency recording.

When the thickness of the first coil layer is reduced corresponding to the reduction of thickness of the upper magnetic-pole layer in accordance with requirements for high recording density, DC resistance in the first coil layer is maintained at a low level by increasing the width of the coil conductor of the first coil layer. Therefore, a thin-film magnetic head can be provided, in which power loss in the first coil layer is suppressed.

The distance between each winding of the coil conductor of the second coil layer may be smaller than the distance between each winding of the coil conductor of the first coil layer.

With this arrangement, the length of the upper core layer from a part of the second coil layer in the vicinity of the coil center thereof to the periphery of the second coil layer is further reduced, and the magnetic path is thereby further reduced, whereby a thin-film magnetic head having low inductance and capable of high-frequency recording can be provided.

The ratio of the thickness of the coil conductor of the first coil layer to the thickness of the coil conductor of the second coil layer may be not greater than 0.8.

The thin-film magnetic head offers an advantage in that the first and second coil layers can be sufficiently separated from each other by reducing the thickness of the coil conductor of the first coil layer while the thickness of the coil conductor of the second coil layer is maintained so that the DC resistance in the second coil layer is maintained at a low level.

The ratio of the width of the coil conductor of the first coil layer to the width of the coil conductor of the second coil layer may be not smaller than 1.2.

The thin-film magnetic head offers another advantage in that the second coil layer can be formed in a reduced area by reducing the width of the coil conductor of the second coil layer while the width of the coil conductor of the first coil layer is maintained so that the DC resistance in the first coil layer is maintained at a low level when the thickness of the coil conductor of the first coil layer is reduced.

The ratio of the distance between each winding of the coil conductor of the first coil layer to the distance between each winding of the coil conductor of the second coil layer may be not smaller than 1.2.

With this arrangement, the area in which the second coil layer is formed can be further reduced.

In the thin-film magnetic head according to the present invention, a first organic insulation-layer which covers the second coil layer may be provided. The first organic insulation-layer may include an inclined face formed at an end thereof toward a magnetic-medium-opposing face, the inclined face being inclined so as to be gradually separated from a magnetic medium along the inclination in the film-thickness direction such that an angle between the inclined face and the interface between the first organic insulation-layer and the second coil layer is not greater than 60 degrees.

With this arrangement, a resist frame can be formed in predetermined shape and position in a step of forming the resist frame which encloses the upper core layer at a margin thereof by exposing and developing a resist film applied to the first organic insulation-layer. Therefore, the upper core layer can be formed in predetermined shape and position by being formed in a region enclosed by the resist frame.

The lower core layer may be provided with a lower magnetic-pole layer formed at an end of the lower core layer, the lower magnetic-pole layer projecting toward the upper magnetic-pole layer, and the magnetic gap layer may be formed between the upper magnetic-pole layer and the lower magnetic-pole layer.

With this arrangement, leakage magnetic fluxes, which are produced at the magnetic gap layer between the upper and lower magnetic-pole layers, are not likely to be produced at a position separated from a position between the upper and lower magnetic-pole layers, whereby a thin-film magnetic head having high recording density, in which write fringes are suppressed, is obtainable.

In the thin-film magnetic head according to the present invention, an end face of the upper core layer toward a magnetic medium may be formed as an inclined face which is inclined so as to be gradually separated from the magnetic medium along the inclination in the film-thickness direction from the upper magnetic-pole layer.

With this arrangement, the area of the interface between the upper core layer and the upper magnetic-pole layer joined to each other can be increased, in which the upper core layer is not exposed from the upper magnetic-pole layer, whereby magnetic fluxes as leakage fluxes from a magnetic field induced in the upper core layer can be effectively applied to a magnetic medium.

The lower core layer may be provided thereon with an insulative part for setting a gap depth, and a rear end of the magnetic gap layer may be in contact with the insulative part for setting the gap depth.

The magnetic gap layer can be formed so as to have a proper depth in accordance with the width of a gap and the shape of the magnetic gap layer by using the insulative layer for setting a gap depth.

In the thin-film magnetic head according to the present invention, a second organic insulation-layer may be applied to the first coil layer between each winding of the coil conductor thereof. A second inorganic insulation-layer may cover the overall surface of the second organic insulation-layer, a surface of the second inorganic insulation-layer being formed planar. The second coil layer may be formed on the planar surface of the second inorganic insulation-layer.

With this arrangement, production of gaps in the second inorganic insulation-layer can be suppressed by the second organic insulation-layer being applied to the first coil layer between each winding of the coil conductor of the first coil layer, whereby deformation due to inflation of gas disposed in the gaps can be avoided. Therefore, a reliable thin-film magnetic head is obtainable.

Since the surface of the second inorganic insulation-layer can be made flat by polishing, the second coil layer can be formed accurately in desired shape and position on the second inorganic insulation-layer.

The first coil layer may be formed on a surface of a first inorganic insulation-layer, and the second inorganic insulation-layer may be formed such that the distance from the first inorganic insulation-layer to the second inorganic insulation-layer disposed between each winding of the coil conductor of the first coil layer is greater than the distance between each winding of the coil conductor of the first coil layer.

With this arrangement, production of the gaps in the second inorganic insulation-layer can be more reliably suppressed.

The second inorganic insulation-layer may comprise one of $Al_2O_3$ and $SiO_3$, and the second organic insulation-layer may comprise one of a novolak resin and a polyimide resin.

The first coil layer is applied with the second organic insulation-layer so that the second inorganic insulation-layer easily enters between each winding of the coil conductor of the first coil layer, and the surface of the second inorganic insulation-layer is easily polished to be flat and smooth.

The magnetic gap layer may comprise a nonmagnetic metal capable of being formed by electrolytic plating.

Since at least the magnetic gap layer and the upper magnetic-pole layer can be formed continuously by electrolytic plating, manufacturing processes can be simplified. The nonmagnetic metal which can be formed by electrolytic plating may be selected from NiP, NiW, NiMo, Au, Pt, Rh, Pd, Ru, and Cr.

A method for manufacturing a thin-film magnetic head according to the present invention comprises the steps of forming a magnetic gap layer on a lower core layer; forming an upper magnetic-pole layer on the magnetic gap layer; forming a first coil layer on the lower core layer; forming a second inorganic insulation-layer which covers the first coil layer; polishing upper surfaces of the second inorganic insulation-layer and the upper magnetic-pole layer such that the upper surfaces are formed planar and are disposed continuously on the same plane; forming a second coil layer on the second inorganic insulation-layer after polishing the upper surfaces of the second inorganic insulation-layer and the upper magnetic-pole layer, the thickness of a coil conductor of the second coil layer being greater than the thickness of a coil conductor of the first coil layer; forming a first organic insulation-layer for covering the second coil layer; forming a fourth resist frame on the first organic insulation-layer, for enclosing an upper core layer at the periphery thereof; and forming the upper core layer in a region enclosed by the fourth resist frame. The fourth resist frame is formed in such a manner that a resist applied to the first organic insulation-layer is exposed in a pattern of the fourth resist frame.

In the method for manufacturing a thin-film magnetic head, an end face of the upper core layer toward a magnetic-disc-opposing face can be formed as an inclined face which is inclined so as to be separated from a magnetic medium gradually along the inclination in a film-thickness direction.

The method for manufacturing a thin-film magnetic head further comprises the step of forming a second organic insulation-layer after forming the first coil layer, the first coil layer being filled with the second organic insulation-layer entering between each winding of a coil conductor of the first coil layer. The second inorganic insulation-layer is formed by sputtering on a surface of the second organic insulation-layer.

In the method for manufacturing a thin-film magnetic head, the second inorganic insulation-layer can be formed without gaps.

The method for manufacturing a thin-film magnetic head further comprises the step of forming an insulative layer for setting a gap depth on the lower core layer. The magnetic gap layer is formed after the insulative layer for setting a gap depth is formed.

In the method for manufacturing a thin-film magnetic head, the depth of the magnetic gap layer can be set correctly.

DESCRIPTION OF THE PREFERRED EMBODIMENTS

The configuration of a thin-film magnetic head is described below with reference to FIGS. 1 to 3. The thin-film magnetic head according to the present invention is a combination-type thin-film magnetic head including a reproducing head h1 formed on a recording head h2, the combination-type thin-film magnetic head being formed on a head-forming-face 61a of a slider 61.

Figure 1:
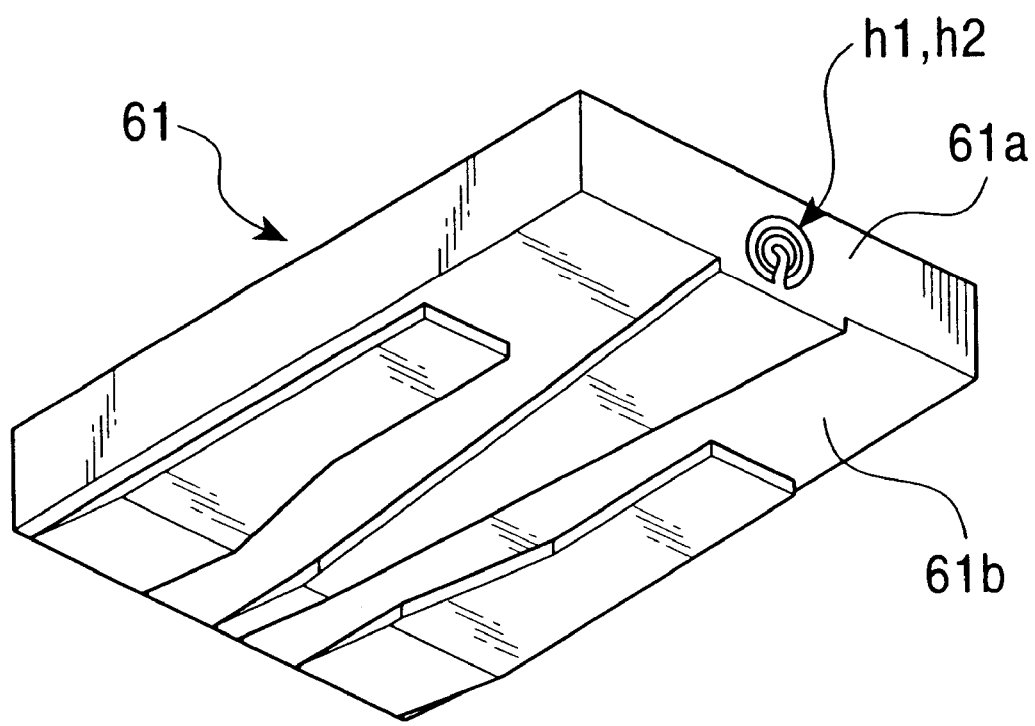
FIG. 1 is a perspective view of a slider provided with a thin-film magnetic head according to the present invention.

In FIG. 1, the slider 61 has a substantially rectangular shape and is made of a nonmagnetic material such as a ceramic. The head-forming-face 61a and a magnetic-disc-opposing face 61b of the slider 61 are disposed adjacent and substantially perpendicular to each other.

Figure 2:
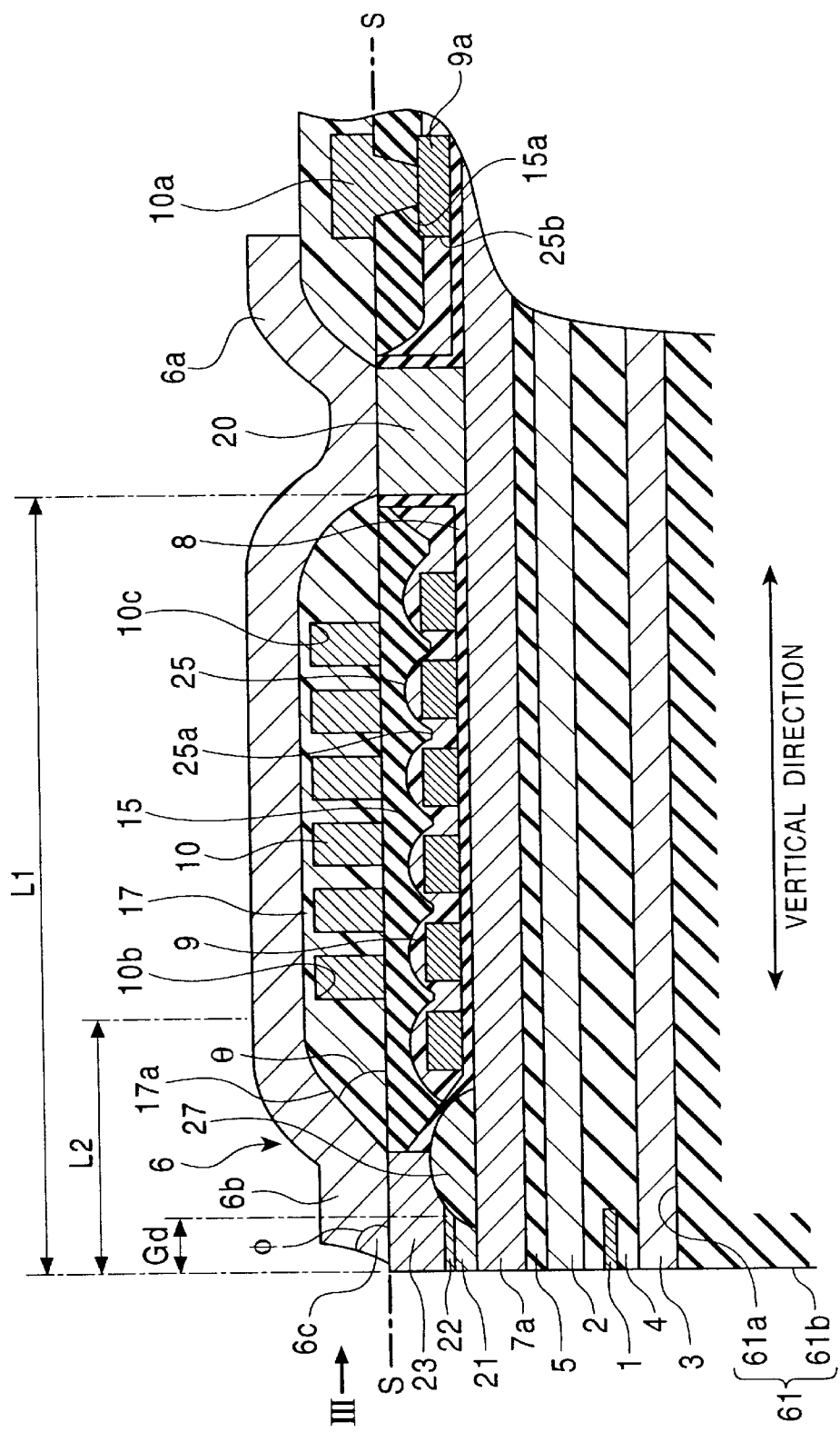
FIG. 2 is a sectional view of the thin-film magnetic head shown in FIG. 1.

As shown in FIG. 2, the reproducing head h1 includes upper and lower shield layers 2 and 3 opposing each other, which are made of a soft magnetic material such as a permalloy. The upper and lower shield layers 2 and 3 sandwich a magnetoresistive element 1, such as an AMR element (anisotropic magnetoresistive element) or a GMR element (giant magnetoresistive element), via an insulation layer 4.

The recording head h2 is formed on the upper shield layer 2 of the reproducing head h1 via a separation layer 5. The recording head h2 is an inductive head which includes first and second coil layers 9 and 10 disposed between upper and lower core layers 6 and 7, for inducing a magnetic field in the upper and lower core layers 6 and 7 for recording.

An end 7a of the lower core 7 formed on the separation layer 5 is extended to the magnetic-disc-opposing face 61b of the slider 61.

A connecting part 20 which is made of a soft magnetic material such as a permalloy is magnetically connected to the lower core layer 7. The distance in a vertical direction perpendicular to the magnetic-disc-opposing face 61b from the connecting part 20 to the magnetic-disc-opposing face 61b has a predetermined first value L1. The first value L1 has been reduced so as to meet requirements for high-frequency recording and is set to, for example, 18 µm or less.

An insulative part 27 for setting a gap depth (hereinafter referred to as an insulative Gd-setting part 27) is formed on the lower core layer 7, the insulative Gd-setting part 27 being made of an organic insulative material such as a resist. The insulative Gd-setting part 27 is positioned toward the magnetic-disc-opposing face 61b rather than toward the connecting part 20. The insulative Gd-setting part 27 and the connecting part 20 are substantially aligned with each other in a vertical direction.

The distance in a vertical direction from the insulative Gd-setting part 27 to the magnetic-disc-opposing face 61b has a predetermined gap-depth value Gd. The gap-depth value Gd is set according to the width of a magnetic gap and the shape around the magnetic gap, for example, to approximately 0.5 µm.

Figure 3:
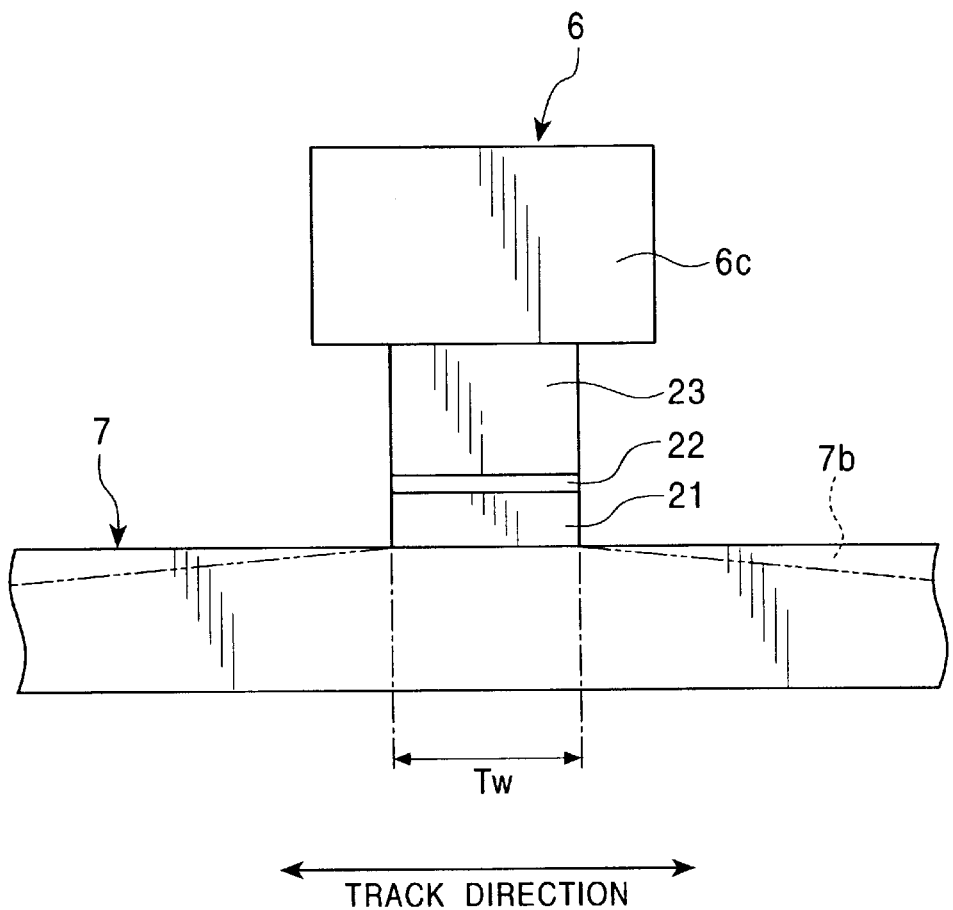
FIG. 3 is a plan view in a direction 3 of the thin-film magnetic head shown in FIG. 2.

In FIG. 3, a lower magnetic-pole layer 21 made of a soft magnetic material such as a permalloy, a magnetic gap layer 22 made of a nonmagnetic material such as NiP, and an upper magnetic-pole layer 23 made of a soft magnetic material such as a permalloy are successively laminated on the end 7a of the lower core layer 7.

The lower magnetic-pole layer 21, the magnetic gap layer 22, and the upper magnetic-pole layer 23 are exposed at the magnetic-disc-opposing face 61b. The width along the magnetic-disc-opposing face 61b (in a track-width direction) of each exposed part of the lower magnetic-pole layer 21, the magnetic gap layer 22, and the upper magnetic-pole layer 23 has a predetermined track-width value $T_w$.

The track-width value $T_w$ is preferably set to 0.7 µm or less, more preferably to 0.5 µm or less in order to cope with requirements for high recording density. The thickness of a layered part including the lower magnetic-pole layer 21, the magnetic gap layer 22, and the upper magnetic-pole layer 23, that is, the distance from the surface of the lower core layer 7 to the upper face of the upper magnetic-pole layer 23 is set to, for example, approximately 2.3 µm.

The lower core layer 7 may be provided with inclined faces 7b such that the thickness of the lower core layer 7 decreases toward both sides in the track-width direction of the lower core layer 7.

The lower magnetic-pole layer 21 and the magnetic gap layer 22 are in contact with the insulative Gd-setting part 27 at respective rear ends of the lower magnetic-pole layer 21 and the magnetic gap layer 22. Thus, the size in a vertical direction of the magnetic gap layer 22 is set to the gap depth Gd.

Although in a known thin-film magnetic head, the distance between the surface of the lower core layer 7 and the upper face of the upper magnetic-pole layer 23 has been set to approximately 3.0 µm, the thickness of the upper magnetic-pole layer 23 is reduced to meet the requirements for high recording density and is preferably set to 2.5 µm or less.

The size in a vertical direction of the upper magnetic-pole layer 23 is preferably set to 0.8 µm or greater so as to ensure a sufficiently large contact area with the upper core layer 6 to which the upper magnetic-pole layer 23 is bonded at the upper face thereof.

The upper face of the upper magnetic-pole layer 23 is disposed at the same level as the upper face of the connecting part 20. A plane including the upper faces of the upper magnetic-pole layer 23 and the connecting part 20 is used as a reference plane S.

The lower core layer 7 is covered with a first inorganic insulation-layer 8 made of, for example, $Al_2O_3$. A first coil layer 9 made of a conductive material such as Cu is formed on the upper surface of the first inorganic insulation-layer 8.

The first coil layer 9 is formed in a spiral in plan view. A coil center 9a of the first coil layer 9 is disposed in the vicinity of the connecting part 20 such that the first coil layer 9 is wound substantially about the connecting part 20. The first coil layer 9 is formed such that the outer periphery thereof is adjacent the insulative Gd-setting part 27. The distance between the connecting part 20 and the insulative Gd-setting part 27 is substantially the same as the radius of the first coil layer 9.

The width along the surface of the first inorganic insulation-layer 8 of a coil conductor of the first coil layer 9 and the distance between each winding of the coil conductor of the first coil layer 9 are set such that the coil conductor of the first coil layer 9 is wound a proper number of times between the connecting part 20 and the insulative Gd-setting part 27. The thickness in a direction perpendicular to the reference plane S of the coil conductor of the first coil layer 9 is set such that the first coil layer 9 is formed at a sufficiently large distance from the reference plane S.

When the width and the thickness of the coil conductor of the first coil layer 9 are excessively small, DC resistance is increased. Therefore, the width and the thickness of the coil conductor of the first coil layer 9 must be set properly, for example, to approximately 1.7 µm and 1.5 µm, respectively. The distance between each winding of the coil conductor is set to approximately 1.2 µm. When the distance between each winding is 0.7 µm or greater, pattern formation by using photolithography can be performed correctly.

The first coil layer 9 is covered with a second organic insulation-layer 25 which is made of a novolak resin or a polyimide resin. The second organic insulation-layer 25 is provided concavities 25a in the surface thereof between each winding of the coil conductor of the first coil layer 9.

Each concavity 25a of the second organic insulation-layer 25 is formed shallow such that the thickness of the second organic insulation-layer 25 between each winding of the coil conductor of the first coil layer 9, that is, at the bottom of the concavity 25a is greater than the distance between each winding of the coil conductor of the first coil layer 9. The upper surface of the second organic insulation-layer 25 formed on the first coil layer 9 is disposed at a sufficiently large distance from the reference plane S.

The second organic insulation-layer 25 is provided with an opening 25b in a position associating with the coil center 9a of the first coil layer 9. The coil center 9a of the first coil layer 9 is exposed through the opening 25b of the second organic insulation-layer 25.

The overall upper surface of the second organic insulation-layer 25 is covered with a second inorganic insulation-layer 15 made of, for example, $Al_2O_3$ formed by sputtering. The second inorganic insulation-layer 15 is formed such that the concavities 25a of the second organic insulation-layer 25 disposed between each winding of the coil conductor of the first coil layer 9 are filled with the second inorganic insulation-layer 15.

Each concavity 25a of the second organic insulation-layer 25 is formed shallow such that the thickness of the second organic insulation-layer 25 between each winding of the coil conductor of the first coil layer 9, that is, at the bottom of the concavity 25a is greater than the distance between each winding of the coil conductor of the first coil layer 9. Therefore, the second inorganic insulation-layer 15 is formed without gaps therein between each winding of the coil conductor. The gaps formed in the second inorganic insulation-layer 15 would cause deformation of the thin-film magnetic head by expansion of gas in the gaps.

The second inorganic insulation-layer 15 is formed planar such that the upper face thereof is disposed at the same level as the reference plane S. The second inorganic insulation-layer 15 is thick since the surface of the second organic insulation-layer 25 sufficiently separates from the reference plane S.

Since the second inorganic insulation-layer 15 is thick, a risk is avoided in that the second organic insulation-layer 25 is exposed at the surface of the second inorganic insulation-layer 15 and the planar upper face of the second inorganic insulation-layer 15 is damaged due to variations in accuracy in grinding the upper face of the second inorganic insulation-layer 15 so as to be flat at the level of the reference plane S.

The second inorganic insulation-layer 15 is provided with an opening 15a in a position associating with the coil center 9a of the first coil layer 9. The coil center 9a of the first coil layer 9 is exposed through the opening 15a of the second inorganic layer 15.

A second coil layer 10 made of a conductive material such as Cu is formed on the surface of the second inorganic insulation-layer 15 disposed at the level of the reference plane S. The second coil layer 10 is formed in a spiral in plan view. A coil center 10a of the second coil layer 10 is disposed in the vicinity of a position above the connecting part 20 such that the second coil layer 10 is wound substantially about the position above the connecting part 20.

The coil center 9a of the first coil layer 9 and the coil center 10a of the second coil layer 10 are connected to each other through the opening 25b of the second organic insulation-layer 25 and the opening 15a of the second inorganic insulation-layer 15, whereby the first and second coil layers 9 and 10 are connected to each other in series.

The second coil layer 10 is disposed at a predetermined distance from the magnetic-disc-opposing face 61b. The distance in a vertical direction from the periphery of the second coil layer 10 to the magnetic-disc-opposing face 61b has a predetermined second value L2. By setting the second value L2 to a large value, the upper core layer 6 is formed in a shape and a position exactly as designed, and the upper core layer 6 and the second coil layer 10 can be reliably insulated from each other. The second value L2 is set to, for example, approximately 10 µm.

The second value L2 of the distance from the periphery of the second coil layer 10 to the magnetic-disc-opposing face 61b is set to a value greater than that of the distance from the periphery of the first coil layer 9 to the magnetic-disc-opposing face 61b. The coil centers 9a and 10a of the first and second coil layers 9 and 10, respectively, are disposed in the same position; therefore, the diameter of the second coil layer 10 must be set smaller than that of the first coil layer 9.

Therefore, since the second coil layer 10 must be provided with a proper number of windings formed in a area smaller than the area of the first coil layer 9, the width of a coil conductor of the second coil layer 10 along the surface of the second inorganic insulation-layer 15 and the distance between each winding of the coil conductor are set smaller than the width of a coil conductor of the first coil layer 9 and the distance between each winding of the coil conductor, respectively.

Thus, when the width of the coil conductor of the second coil layer 10 and the distance between each winding of the conductor thereof are reduced, the diameter of the second coil layer 10 can be reduced. Since the diameter of the second coil layer 10 and the first value L1 between the connecting part 20 and the magnetic-disc-opposing face 61b are reduced, the thin-film magnetic head according to the present embodiment, which has a short magnetic path and low inductance, can meet requirements for high-frequency recording.

The second coil layer 10 is formed such that the thickness in a direction perpendicular to the reference plane S of the coil conductor of the second coil layer 10 is greater than the thickness of the coil conductor of the first coil layer 9, whereby low DC resistance in the second coil layer 10 can be maintained although the width of the coil conductor thereof is reduced.

The width, the distance between each winding, and the thickness of the coil conductor of the second coil layer 10 are set to, for example, approximately 1 µm, 1 µm, and 2.6 µm, respectively.

Since the first coil layer 9 sufficiently separates from the reference plane S on which the second coil layer 10 is formed, the first coil layer 9 and the second coil layer 10 are reliably insulated from each other except for the coil centers 9a and 10a of the first and second coil layers 9 and 10, respectively.

The first and second coil layers 9 and 10 can be disposed at a sufficiently large distance from each other, when the ratio of the thickness of the coil conductor of the first coil layer 9 to the thickness of the coil conductor of the second coil layer 10 is not greater than 0.8, by reducing the thickness of the coil conductor of the first coil layer 9 while maintaining the thickness of the second coil layer 10 so as to maintain DC resistance in the second coil layer 10 at a low level.

The diameter of the second coil layer 10 can be sufficiently reduced, when the ratio of the width of the coil conductor of the first coil layer 9 to the width of the coil conductor of the second coil layer 10 is not smaller than 1.2, by reducing the width of the coil conductor of the second coil layer 10 while maintaining the width of coil conductor of the first coil layer 9 so as to maintain DC resistance in the first coil layer 9 at a low level.

A first organic insulation-layer 17, which includes a novolak-based or polyimide-based resist, covers the second coil layer 10 at the surface of the second inorganic insulation-layer 15. The second coil layer 10 is covered with the first organic insulation-layer 17 applied between each winding of the coil conductor of the second coil layer 10. The first organic insulation-layer 17 is not formed above the upper magnetic-pole layer 23 and above the connecting part 20. The first organic insulation-layer 17 extends toward the magnetic-disc-opposing face 61b to the vicinity of the upper magnetic-pole layer 23.

An inclined face 17a is formed at an end of the first organic insulation-layer 17 toward the magnetic-disc-opposing face 61b, in such a manner that the inclined face 17a is gradually separated from the magnetic-disc-opposing face 61b along the inclination in the film-thickness direction.

In order to reduce an angle θ between the inclined face 17a and the surface of the second inorganic insulation-layer 15, which corresponds to the reference plane S, the distance from the periphery of the second coil layer 10 to the upper magnetic-pole layer 23 is increased, that is, the second value L2 of the distance between the periphery of the second coil layer 10 and the magnetic-disc-opposing face 61b is increased, whereby the first organic insulation-layer 17 is elongated at an end thereof from the periphery of the second coil layer 10 to the vicinity of the upper magnetic-pole layer 23.

The angle θ between the inclined face 17a and the surface of the second inorganic insulation-layer 15, which is the reference plane S, is preferably not greater than 60°. The upper core layer 6 can be formed in designed position and shape as exactly as the angle θ is smaller, for which a manufacturing method is described below.

When the angle θ between the inclined face 17a and the surface of the second inorganic insulation-layer 15, which is the reference plane S, is reduced in the manner described above, the thickness of the second organic insulation-layer 17 can be maintained at a peripheral corner 10b of the second coil layer 10, whereby the second coil layer 10 can be reliably insulated from the upper core layer 6 formed on the first organic insulation-layer 17.

The inner periphery of the second coil layer 10 can be formed separate from the connecting part 20 by reducing the width of the coil conductor of the second coil layer 10 and the distance between each winding of the coil conductor thereof. When the inner periphery of the second coil layer 10 is formed away from the connecting part 20, the thickness of the first organic insulation-layer 17 can be maintained in a portion thereof at which the first organic insulation-layer 17 covers an inner-peripheral corner 10c of the second coil layer 10, whereby the second coil layer 10 can be reliably insulated from the upper core layer 6 formed on the first organic insulation-layer 17.

The upper core layer 6 is formed on the first organic insulation-layer 17, and is joined to the upper surface of the connecting part 20 at one part of the upper core layer 6 toward a rear end 6a thereof and to the upper surface of the upper magnetic-pole layer 23 at an end 6b of the upper core layer 6 toward the magnetic-disc-opposing face 61b, the end 6b without being exposed at the magnetic-disc-opposing face 61b. The interface between the upper magnetic-pole layer 23 and the upper core layer 6, which are joined to each other, is disposed on the reference plane S.

The upper core layer 6 is magnetically connected to the lower core layer 7 via the connecting part 20 and to the upper magnetic-pole layer 23. Magnetic fluxes from the upper core layer 6 flow to the upper magnetic-pole layer 23 and to the lower core layer 7 from the upper magnetic-pole layer 23, and return to the upper core layer 6 via the connecting part 20.

For high-frequency recording, the length of a magnetic path from the upper core layer 6 to the lower core layer 7 and back to the upper core layer 6 must be reduced, thereby providing a low inductance.

According to the present embodiment, the length of the magnetic path can be reduced by reducing the length of the upper core layer 6 extending from the coil center 10a to the periphery of the second coil layer 10 and the first value L1 of the distance between the connecting part 20 and the magnetic-disc-opposing face 61b.

The end 6b of the upper core layer 6 is formed at the side of the magnetic-disc-opposing face 61b, in such a manner that an end face 6c of the end 6b is inclined such that the end face 6c gradually separates from the magnetic-disc-opposing face 61b along the inclination in the film-thickness direction. By thus forming the end 6b of the upper core layer 6, an area of the upper core layer 6 joined to the upper magnetic-pole layer 23 can be increased without exposing the end 6b of the upper core layer 6 at the magnetic-disc-opposing face 61b. When the area of the upper core layer 6 joined to the upper magnetic-pole layer 23 is increased, magnetic fluxes flow effectively from the upper core layer 6 to the upper magnetic-pole layer 23 side.

The end 6b of the upper core layer 6 is preferably formed such that an angle φ between the end face 6c and the upper surface of the upper magnetic-pole layer 23 is not smaller than the angle θ between the inclined face 17a of the first organic insulation-layer 17 and the surface of the second inorganic insulation-layer 15. When the angle φ between the end face 6c and the upper surface of the upper magnetic-pole layer 23 is smaller than 60° when the angle θ between the inclined face 17a of the first organic insulation-layer 17 and the surface of the second inorganic insulation-layer 15 is, for example, 60°, the volume of the end 6b of the upper core layer 6 is reduced, whereby the efficiency in transmission of the magnetic fluxes from the upper core layer 6 to the upper magnetic-pole layer 23 is deteriorated.

The width in the track direction of the end 6b of the upper core layer 6 is preferably 2 to 2.5 times a track width $T_w$ of the upper magnetic-pole layer 23. When the width of the end 6b of the upper core layer 6 is in this range, the upper surface of the upper magnetic-pole layer 23 can be easily positioned accurately with respect to the upper core layer 6 when the upper core layer 6 is formed on the upper magnetic-pole layer 23, and the magnetic fluxes can flow effectively from the upper core layer 6 to the upper magnetic-pole layer 23 side.

More preferably, the lower magnetic-pole layer 21 and the upper magnetic-pole layer 23 have magnetic density saturation higher than that of the lower core layer 7 and the upper core layer 6. With this arrangement, the magnetic fluxes concentrate in the vicinity of the magnetic gap layer 22.

A method for manufacturing the thin-film magnetic head, in particular, the recording head h2, according to the present invention, is described below with reference to FIGS. 4 to 19. The separation layer 5 is deposited after the reproducing head h1 is formed, and the lower core layer 7 is formed on the separation layer 5.

Figure 4:
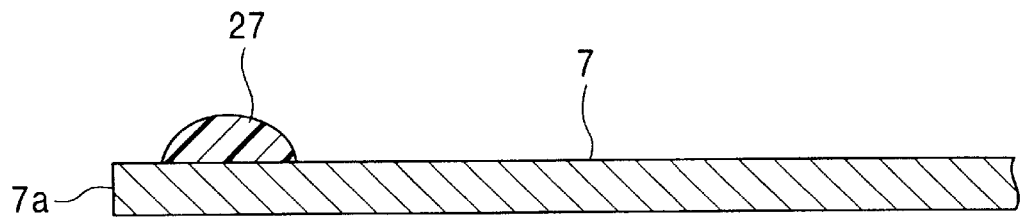
FIG. 4 is an illustration showing a step in the method for manufacturing a thin-film magnetic head according to the present invention.
Figure 5:
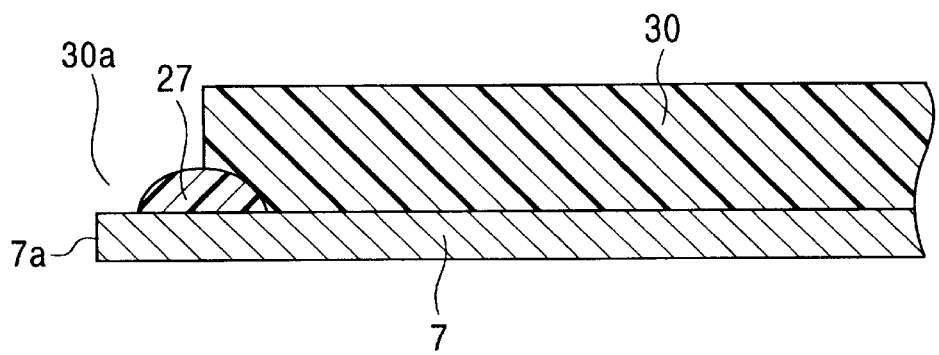
FIG. 5 is an illustration showing a step in the method for manufacturing a thin-film magnetic head according to the present invention.

The insulative Gd-setting part 27 is formed in a predetermined position of the surface of the lower core layer 7, as shown in FIG. 4. In FIG. 5, a first resist frame 30 is formed on the lower core layer 7.

The first resist frame 30 is provided with an opening 30a toward the magnetic-disc-opposing face 61b. The width in the track direction of the opening 30a is substantially the same as the track width $T_w$. The insulative Gd-setting part 27 is exposed from the opening 30a of the first resist frame 30 at a portion of the insulative Gd-setting part 27 toward the magnetic-disc-opposing face 61b.

The lower magnetic-pole layer 21, the magnetic gap layer 22, and the upper magnetic-pole layer 23 are formed by electrolytic plating in this order on the lower core layer 7 which is provided with the first resist frame 30.

Since the magnetic gap layer 22 is made of a nonmagnetic metal, such as NiP, which can be deposited by electrolytic plating, the lower magnetic-pole layer 21, the magnetic gap layer 22, and the upper magnetic-pole layer 23 can be successively formed by electrolytic plating, whereby manufacturing processes can be simplified.

Figure 6:
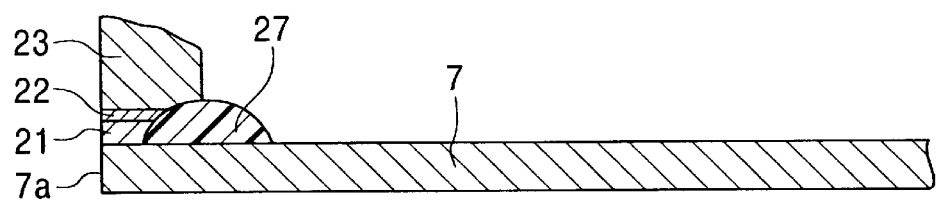
FIG. 6 is an illustration showing a step in the method for manufacturing a thin-film magnetic head according to the present invention.

After the lower magnetic-pole layer 21, the magnetic gap layer 22, and the upper magnetic-pole layer 23 are formed, the first resist frame 30 is removed, as shown in FIG. 6.

After the first resist frame 30 is removed, the width in the track direction of the lower magnetic-pole layer 21, the magnetic gap layer 22, and the upper magnetic-pole layer 23 is reduced to the track width $T_w$ by ion milling. In this case, an ion-applying angle is approximately 70° with respect to the film-thickness direction of the upper and lower magnetic-pole layers 23 and 21.

Figure 7:
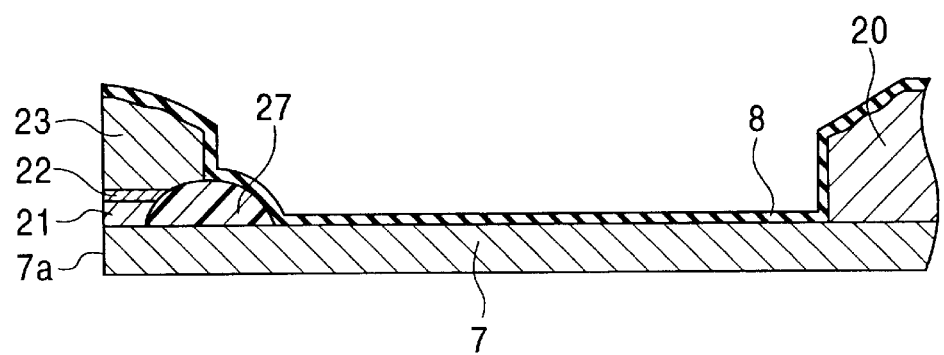
FIG. 7 is an illustration showing a step in the method for manufacturing a thin-film magnetic head according to the present invention.

Then, the connecting part 20 is formed in a predetermined position on the surface of the lower core layer 7. The first inorganic insulation-layer 8 is formed, which covers the lower core layer 7, the insulative Gd-setting part 27, the connecting part 20, and the upper magnetic-pole layer 23, as shown in FIG. 7.

Figure 8:
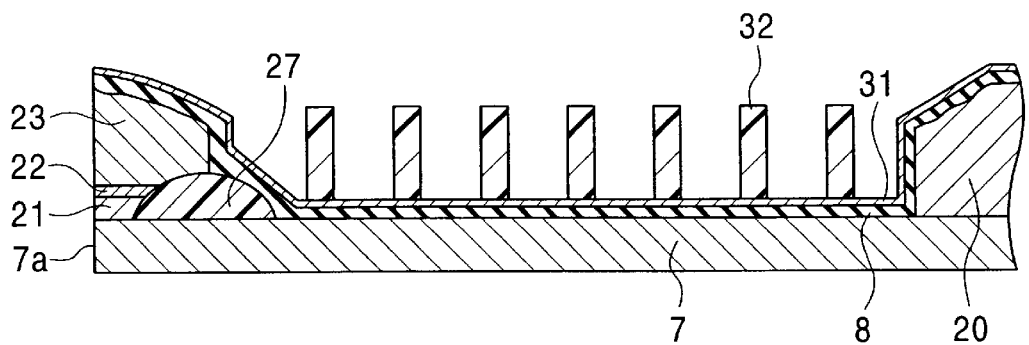
FIG. 8 is an illustration showing a step in the method for manufacturing a thin-film magnetic head according to the present invention.

A Cu primary coat 31 is formed on the first inorganic insulation-layer 8 by sputtering, the Cu primary coat 31 being for forming the first coil layer 9 by electrolytic plating, as shown in FIG. 8.

A resist film for forming a second resist frame 32 is applied to the surface of the Cu primary coat 31. The resist film is removed by being exposed at a position of a pattern of the first coil layer 9 and is developed to form the second resist frame 32.

A Cu film is plated on the Cu primary coat 31 in a region of the second resist frame 32, thereby forming the first coil layer 9 in a position enclosed by the second resist frame 32.

Figure 9:
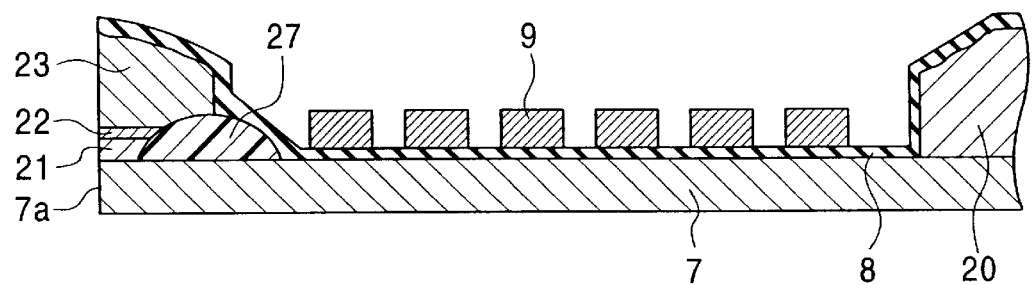
FIG. 9 is an illustration showing a step in the method for manufacturing a thin-film magnetic head according to the present invention.

The formation of the first coil layer 9 is completed after removing the Cu film except for a portion thereof for the first coil layer 9 and an unnecessary part of the Cu primary coat 31, as shown in FIG. 9.

Figure 10:
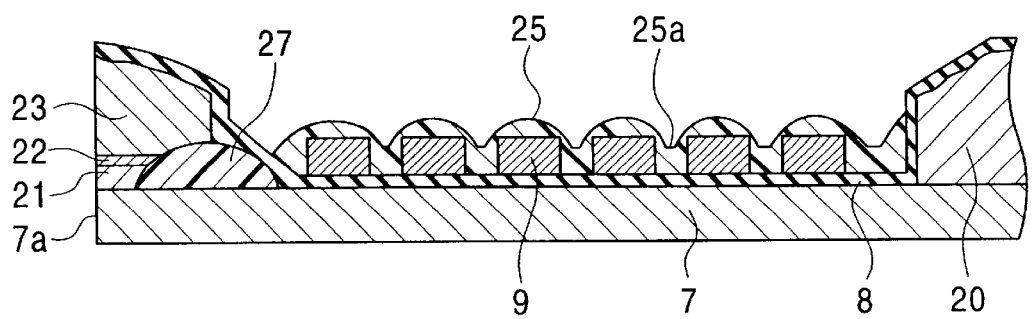
FIG. 10 is an illustration showing a step in the method for manufacturing a thin-film magnetic head according to the present invention.

In FIG. 10, the second organic insulation-layer 25 covering the first coil layer 9 is formed by spin coating after the first coil layer 9 is formed. The second organic insulation-layer 25 is applied to the first coil layer 9 and enters between each winding of the coil conductor of the first coil layer 9 such that the thickness of the second organic insulation-layer 25 between each winding of the coil conductor of the first coil layer 9 is the same as the distance between each winding of the coil conductor of the first coil layer 9. The concavities 25a formed in the surface of the second organic insulation-layer 25 between each winding of the coil conductor of the first coil layer 9 are shallow.

Figure 11:
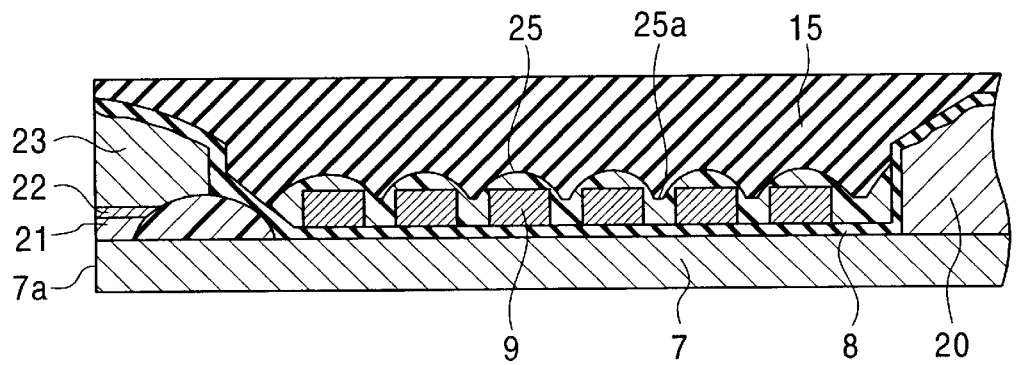
FIG. 11 is an illustration showing a step in the method for manufacturing a thin-film magnetic head according to the present invention.
Figure 12:
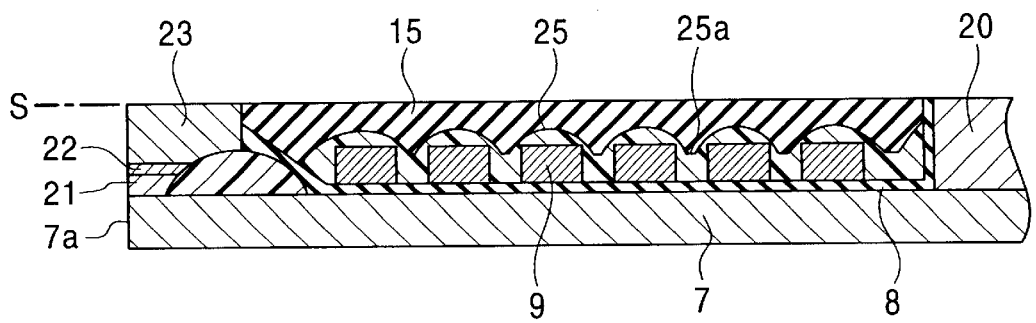
FIG. 12 is an illustration showing a step in the method for manufacturing a thin-film magnetic head according to the present invention.

After the second organic insulation-layer 25 is formed, the second inorganic insulation-layer 15 is deposited by sputtering, as shown in FIG. 11. In this step, the second inorganic insulation-layer 15 covers the second organic insulation-layer 25 and enters into the concavities 25a of the second organic insulation-layer 25. The second inorganic insulation-layer 15 also covers the upper magnetic-pole layer 23 and the connecting part 20.

Since the concavities 25a of the second organic insulation-layer 25 is formed shallow, the second inorganic insulation-layer 15 easily enters into the concavities 25a without forming gaps.

When the concavities 25a in the surface of the second organic insulation-layer 25 is formed deep, it is difficult to form by sputtering the second inorganic insulation-layer 15 in parts hidden by the first coil layer 9 (shadow effect), whereby there is a risk in that gaps are formed in the second inorganic insulation-layer 15.

After the second inorganic insulation-layer 15 is deposited, CMP (chemical mechanical polishing) is performed on the surfaces of the second inorganic insulation-layer 15, the upper magnetic-pole layer 23, and the connecting part 20, whereby the surfaces of the second inorganic insulation-layer 15, the upper magnetic-pole layer 23, and the connecting part 20 are planarly polished so as to be on the same level as the reference plane S.

Since the second inorganic insulation-layer 15 is formed sufficiently thick, a risk of exposing the first coil layer 9 from the second inorganic insulation-layer 15 during the CMP is avoided.

Figure 13:
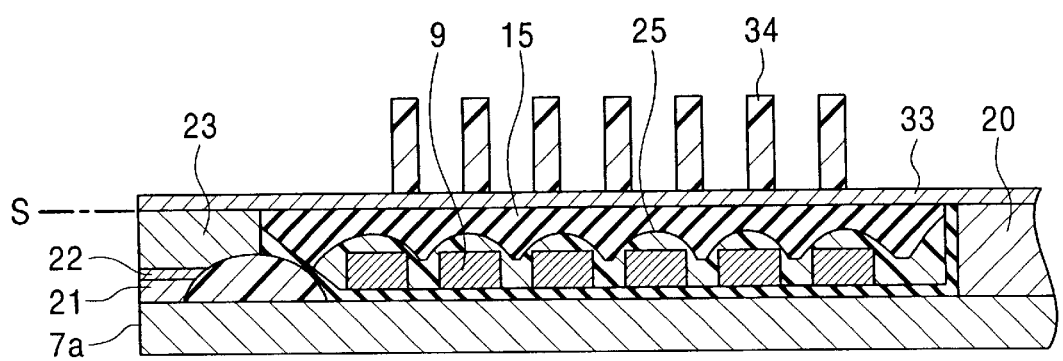
FIG. 13 is an illustration showing a step in the method for manufacturing a thin-film magnetic head according to the present invention.

After the CMP, a Cu primary coat 33 for forming the second coil layer 10 by electrolytic plating is deposited by sputtering on the second inorganic insulation-layer 15, as shown in FIG. 13.

A resist film for forming a third resist frame 34 is applied to the surface of the Cu primary coat 33. The resist film is removed by being exposed at a position of a pattern of the second coil layer 10 and is developed to form the third resist frame 34. The third resist frame 34 can be patterned accurately because the surface of the second inorganic insulation-layer 15 on which the third resist frame 34 is formed is polished so as to be flat.

Figure 14:
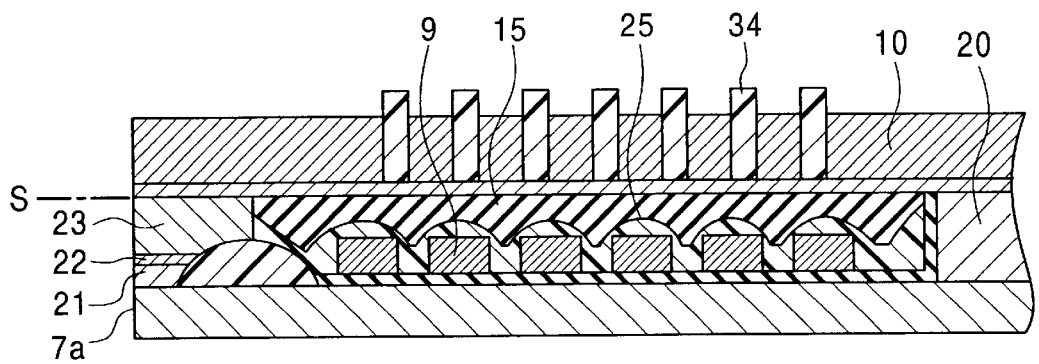
FIG. 14 is an illustration showing a step in the method for manufacturing a thin-film magnetic head according to the present invention.

A Cu film is plated on the Cu primary coat 33 in a region of the third resist frame 34, thereby forming the second coil layer 10 in a position enclosed by the third resist frame 34, as shown in FIG. 14.

Figure 15:
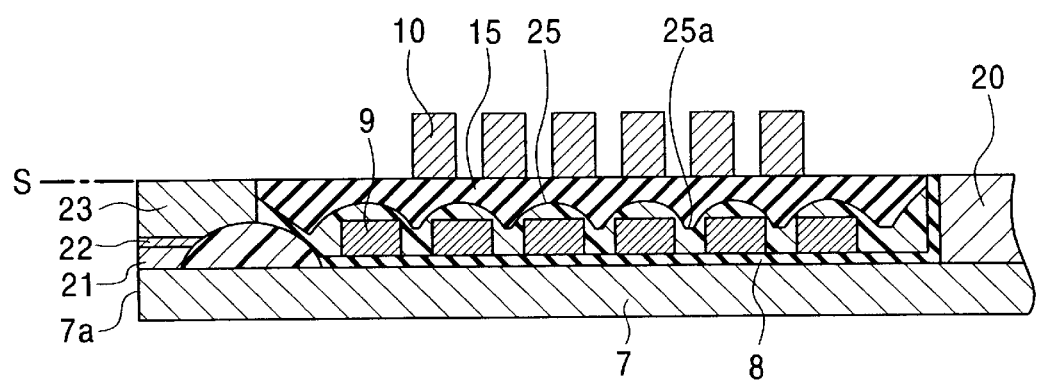
FIG. 15 is an illustration showing a step in the method for manufacturing a thin-film magnetic head according to the present invention.

The formation of the second coil layer 10 is completed after removing the Cu film except for a portion thereof for the second coil layer 10 and an unnecessary part of the Cu primary coat 33, as shown in FIG. 15.

Figure 16:
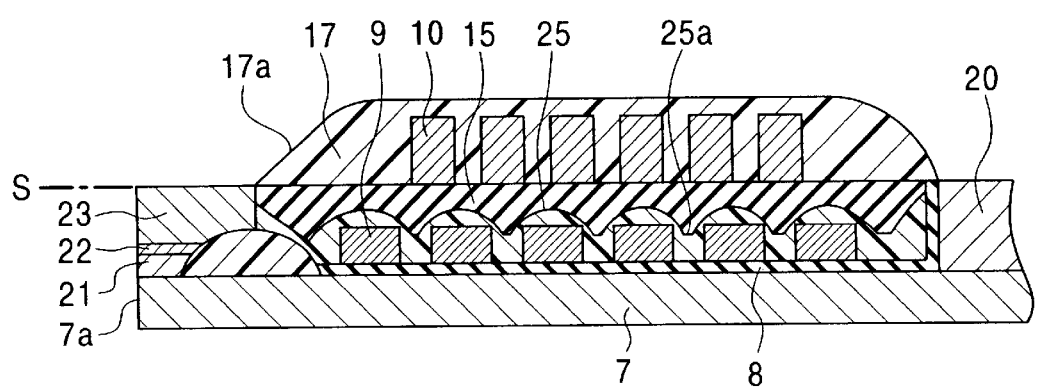
FIG. 16 is an illustration showing a step in the method for manufacturing a thin-film magnetic head according to the present invention.

In FIG. 16, the first organic insulation-layer 17 covering the second coil layer 10 is formed by spin coating after the second coil layer 10 is formed. The first organic insulation-layer 17 is patterned by being exposed and developed by photolithography so that the upper surfaces of the upper magnetic-pole layer 23 and the connecting part 20 are exposed from the first organic insulation-layer 17. The inclined face 17a is formed toward the side of the magnetic-disc-opposing face 61b of the first organic insulation-layer 17.

After the first organic insulation-layer 17 is formed, a permalloy primary coat 35 is formed by sputtering on the first organic insulation-layer 17, the upper magnetic-pole layer 23, and the connecting part 23, for forming the upper core layer 6 by electrolytic plating.

Figure 18:
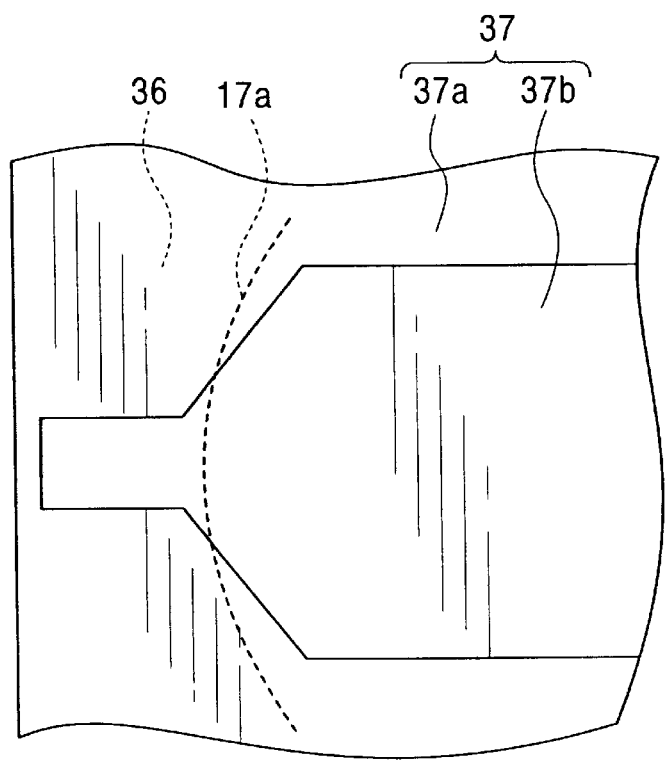
FIG. 18 is an illustration showing a step in the method for manufacturing a thin-film magnetic head according to the present invention.
Figure 19:
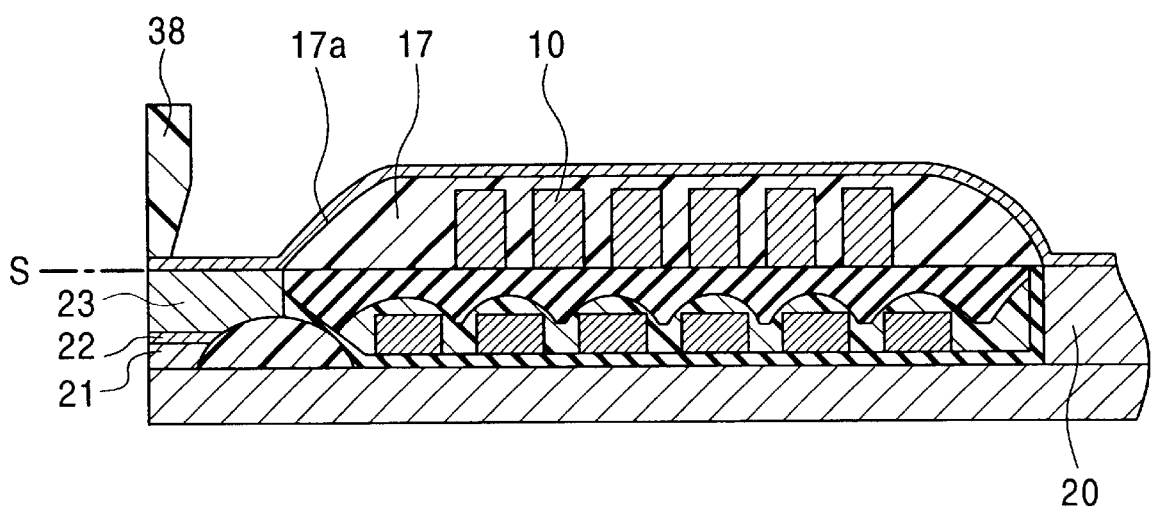
FIG. 19 is an illustration showing a step in the method for manufacturing a thin-film magnetic head according to the present invention.
Figure 20:
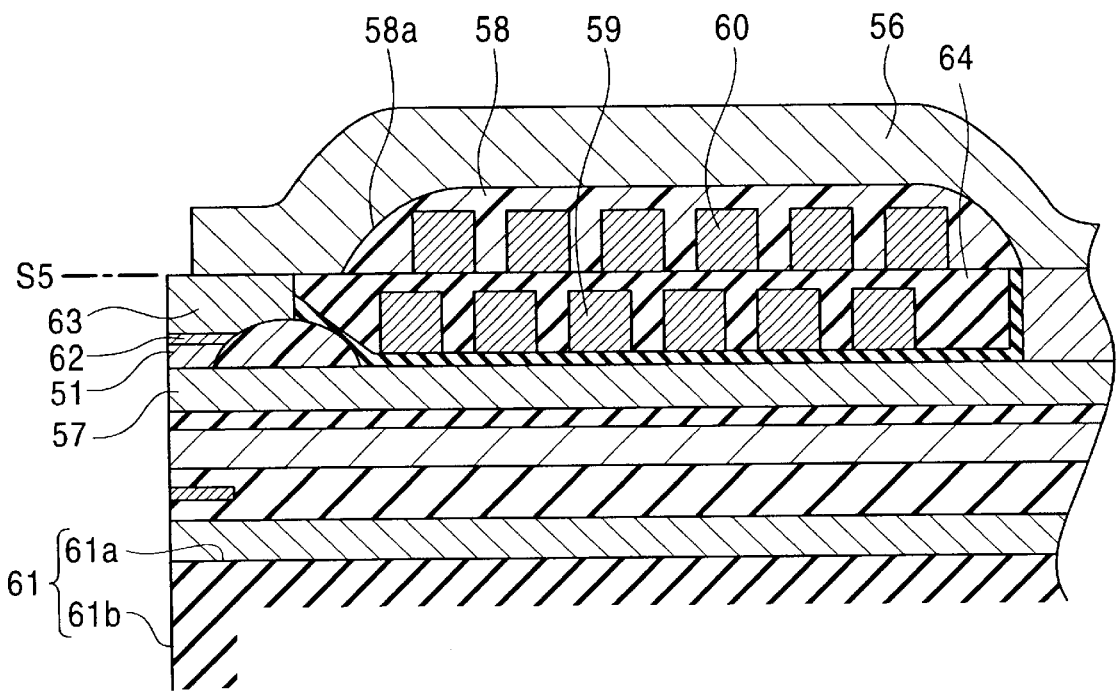
FIG. 20 is a sectional view of a known thin-film magnetic head.
Figure 21:
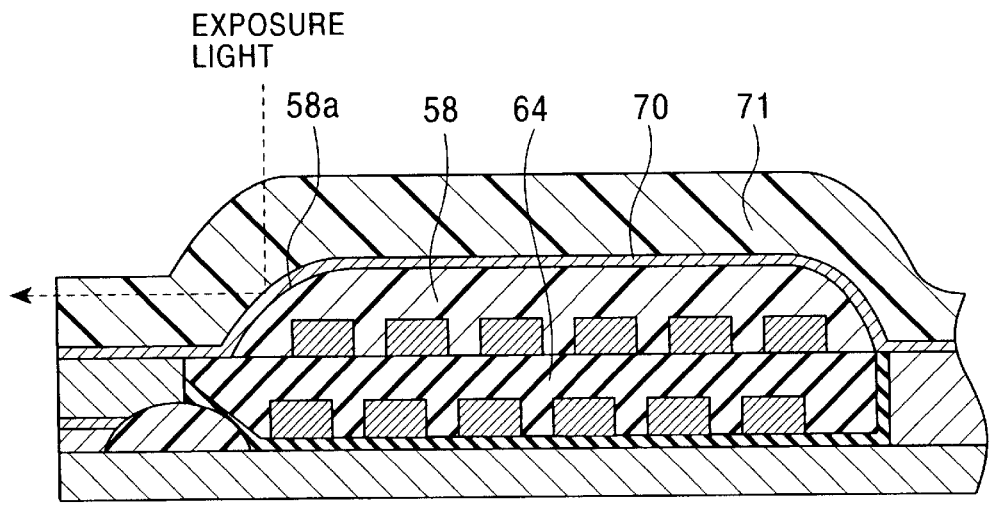
FIG. 21 is an illustration showing a method for manufacturing the known thin-film magnetic head.

Then, a fourth resist frame 38 which encloses the upper core layer 6 at the outer edge thereof is formed, as shown in FIG. 19. In FIG. 18, a mask 37 for forming the fourth resist frame 38 includes an exposure part 37a which remains as the fourth resist frame 38 and a light-shielding part 37b having a shape corresponding to that of the upper core layer 6.

Figure 17:
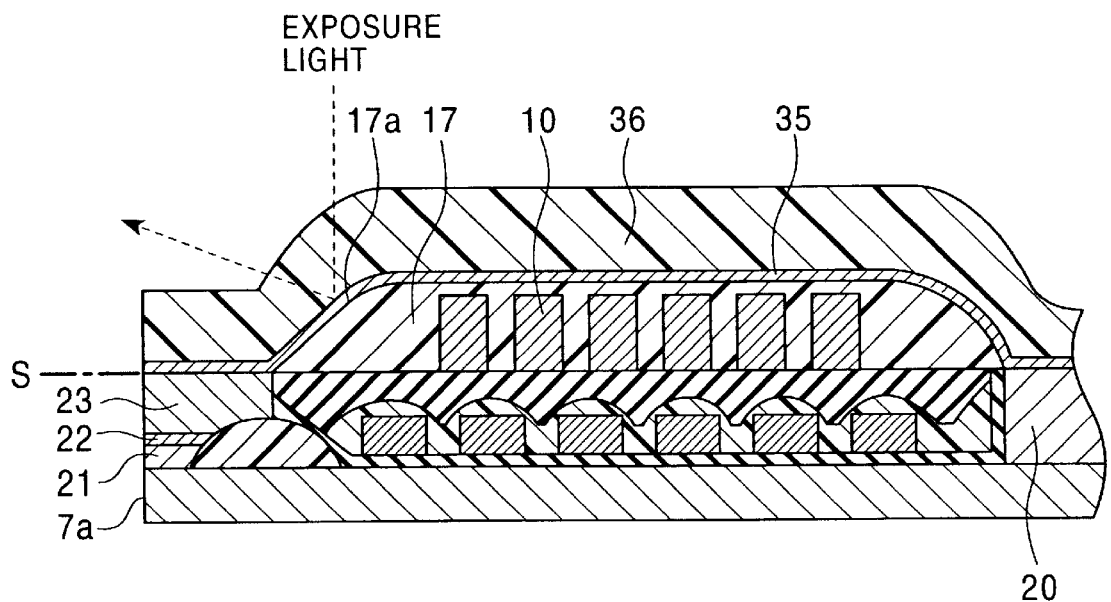
FIG. 17 is an illustration showing a step in the method for manufacturing a thin-film magnetic head according to the present invention.

In an exposure step by photolithography, the mask 37 is placed on a resist film 36 which has been formed on the permalloy primary coat 35, and exposure light is applied to the resist film 36 via the mask 37 disposed thereon. The incident light to the resist film 36 is irregularly reflected toward the side of the magnetic-disc-opposing face 61b at the permalloy primary coat 35 which is formed on the inclined face 17a of the first organic insulation-layer 17, as shown in FIG. 17, the inclined face 17a of the first organic insulation-layer 17 being disposed under the exposure part 37a of the mask 37, as shown in FIG. 18.

The irregularly reflected light also leaks to the resist film 36 which is disposed under the light-shielding part 37b of the mask 37. However, the amount of leakage of the light is smaller as the angle θ of the inclined face 17a of the first organic insulation-layer 17 is smaller. When the angle θ is not greater than 60°, the resist film 36 can be exposed substantially according to the pattern of the exposure part 37a of the mask 37.

When the exposed resist film 36 is developed and a light-shielded part thereof is removed, an exposed part of the resist film 36 remains as the fourth resist frame 38 which encloses the upper core layer 6 at the outer edge thereof.

When the light-shielded part is removed as the exposed part remains, the fourth resist frame 38 which is the exposed part is formed such that a base part of the fourth resist frame 38 is thinner than an edge part thereof in sectional view, as shown in FIG. 19, that is, the inner wall of the fourth resist frame 38 is formed as an inclined face such that the inner wall of the fourth resist frame 38 gradually separates from the magnetic-disc-opposing face 61b along the inclination in the film-thickness direction from the upper magnetic-pole layer 23.

A permalloy film is plated on the permalloy primary coat 35, whereby the upper core layer 6 is formed in a part enclosed by the fourth resist frame 38.

The end face 6c of the end 6b of the upper core layer 6 is formed as an inclined face such that the end face 6c gradually-separates from the magnetic-disc-opposing face 61b along the inclination in the film-thickness direction from the upper magnetic-pole layer 23.

The fourth resist frame 38 is removed, then, unnecessary permalloy-plated film and permalloy primary coat 35 are removed. Thus, the manufacture of the recording head h2 is completed.

An operation of the thin-film magnetic head, in particular, an operation of the recording head h2, according to the present invention, is described below. During driving the recording head h2, current for recording is applied to the first and second coil layers 9 and 10. A magnetic field for recording is induced in the upper and lower core layers 6 and 7 with the first and second coil layers 9 and 10 being applied with the current.

Power loss in the first and second coil layers 9 and 10 which have low DC resistance is small, whereby the magnetic field for recording can be efficiently induced in the upper and lower core layers 6 and 7.

The magnetic field for recording induced in the upper core layer 6 reaches the upper magnetic-pole layer 23. The magnetic field for recording becomes a leakage magnetic field at the magnetic gap layer 22 between the upper and lower magnetic-pole layers 23 and 21, and the leakage magnetic field having the track width $T_w$ is applied to a magnetic disc.

Since a rear end of the magnetic gap layer 22 is in contact with the insulative Gd-setting part 27, the leakage magnetic field is not produced at the rear end side of the magnetic gap layer 22 between the upper and lower magnetic-pole layers 23 and 21 and is effectively applied to the magnetic disc.

Magnetic fluxes can flow effectively from the upper core layer 6 to the magnetic gap layer 22 because the distance from the upper core layer 6 to the magnetic gap layer 22 is reduce by reducing the thickness of the upper magnetic-pole layer 23.

Since the lower magnetic-pole layer 21 is formed projecting from the lower core layer 7 toward the upper magnetic-pole layer 23, the leakage magnetic field, which is produced at the magnetic gap layer 22 between the upper and lower magnetic-pole layers 23 and 21, is not likely to be produced between the upper magnetic-pole layer 23 and the lower core layer 7 which is positioned away from the lower magnetic-pole layer 21. By thus suppressing write fringes, a thin-film magnetic head which copes with requirements for high recording density is obtainable.

The distance from the upper magnetic-pole layer 23 to a point on each inclined face 7b of the lower core layer 7 increases as the distance from the lower magnetic-pole layer 21 to the point on each inclined face 7b increases. Therefore, leakage magnetic field is not likely to be produced between the upper magnetic-pole layer 23 and the inclined faces 7b, thereby suppressing write fringes.

Since the upper core layer 6 is not exposed from the magnetic-disc-opposing face 61b, the magnetic fluxes from the upper core layer 6 are not applied to a magnetic disc, whereby the width of the magnetic fluxes applied to the magnetic disc equals the track width $T_w$.

In a thin-film magnetic head to cope with requirements for high recording density, the width of the magnetic fluxes for recording to be applied to a magnetic disc is desired to to be equal to the track width $T_w$ so as to suppress write fringes, as describe above.

The length of a magnetic path for the magnetic fluxes flowing from the upper core layer 6 to the upper magnetic-pole layer 23, the lower core layer 7, the connecting part 20, and again the upper core layer 6 is reduced because the diameter of the second coil layer 10, the length of the upper core layer 6 extending from the coil center 10a of the second coil layer 10 to the periphery thereof, and the first value L1 of the distance in a vertical direction from the connecting part 20 to the magnetic-disc-opposing face 61b are set small, thereby providing low inductance, whereby the thin-film magnetic head according to the present invention can meet requirements for high-frequency recording.

Although according to the embodiment described above, write fringes are suppressed with the lower magnetic-pole layer 21 being provided, the magnetic gap layer 22 may be formed directly on the surface of the lower core layer 7 without forming the lower magnetic-pole layer 21.

Although a combination-type thin-film magnetic head including the reproducing head h1 and the recording head h2 is used in the above embodiment, the thin-film magnetic head may include only the recording head h2.

What is claimed is:

1. A thin-film magnetic head comprising:
    a lower core layer;
    an upper core layer opposing the lower core layer;
    an upper magnetic-pole layer disposed between the upper core layer and the lower core layer and joined to the upper core layer;
    a magnetic gap layer disposed between the upper magnetic-pole layer and the lower core layer;
    a first coil layer disposed at the lower core layer side of an interface between the upper core layer and the upper magnetic-pole layer, and
    a second coil layer disposed at the upper core layer side of said interface,
    wherein the thickness of a coil conductor of the first coil layer is smaller than the thickness of a coil conductor of the second coil layer, and
    wherein the width of the coil conductor of the second coil layer is smaller than the width of the coil conductor of the first coil layer.

2. A thin-film magnetic head according to claim 1, wherein the ratio of the thickness of the coil conductor of the first coil layer to the thickness of the coil conductor of the second coil layer is not greater than 0.8.

3. A thin-film magnetic head according to claim 1, wherein the ratio of the width of the coil conductor of the first coil layer to the width of the coil conductor of the second coil layer is not smaller than 1.2.

4. A thin-film magnetic head according to claim 1, wherein a first organic insulation-layer which covers the second coil layer is provided, the first organic insulation-layer including an inclined face formed at an end thereof toward a magnetic-medium-opposing face, the inclined face being inclined so as to be gradually separated from a magnetic medium along the inclination in the film-thickness direction such that an angle between the inclined face and the interface between the first organic insulation-layer and the second coil layer is not greater than 60 degrees.

5. A thin-film magnetic head according to claim 1, wherein the lower core layer is provided with a lower magnetic-pole layer formed at an end of the lower core layer, the lower magnetic-pole layer projecting toward the upper magnetic-pole layer, and the magnetic gap layer is formed between the upper magnetic-pole layer and the lower magnetic-pole layer.

6. A thin-film magnetic head according to claim 1, wherein an end face of the upper core layer toward a magnetic medium is formed as an inclined face which is inclined so as to be gradually separated from the magnetic medium along the inclination in the film-thickness direction from the upper magnetic-pole layer.

7. A thin-film magnetic head according to claim 1, wherein the lower core layer is provided thereon with an insulative part for setting a gap depth, and a rear end of the magnetic gap layer is in contact with the insulative part for setting the gap depth.

8. A thin-film magnetic head according to claim 1, wherein the magnetic gap layer comprises a nonmagnetic metal capable of being formed by electrolytic plating.

9. A thin-film magnetic head comprising:
    a lower core layer;
    an upper core layer opposing the lower core layer;
    an upper magnetic-pole layer disposed between the upper core layer and the lower core layer and joined to the upper core layer;
    a magnetic gap layer disposed between the upper magnetic-pole layer and the lower core layer;
    a first coil layer disposed at the lower core layer side of an interface between the upper core layer and the upper magnetic-pole layer; and
    a second coil layer disposed at the upper core layer side of said interface,
    wherein the thickness of a coil conductor of the first coil layer is smaller than the thickness of a coil conductor of the second coil layer, and
    wherein the distance between each winding of the coil conductor of the second coil layer is smaller than the distance between each winding of the coil conductor of the first coil layer.

10. A thin-film magnetic head according to claim 9 wherein the ratio of the distance between each winding of the coil conductor of the first coil layer to the distance between each winding of the coil conductor of the second coil layer is not smaller than 1.2.

11. A thin-film magnetic head comprising:
    a lower core layer;
    an upper core layer opposing the lower core layer;
    an upper magnetic-pole layer disposed between the upper core layer and the lower core layer and joined to the upper core layer;
    a magnetic gap layer disposed between the upper magnetic-pole layer and the lower core layer;
    a first coil layer disposed at the lower core layer side of an interface between the upper core layer and the upper magnetic-pole layer; and
    a second coil layer disposed at the upper core layer side of said interface,
    wherein the thickness of a coil conductor of the first coil layer is smaller than the thickness of a coil conductor of the second coil layer, and
    wherein a second organic insulation-layer is applied to the first coil layer between each winding of the coil conductor thereof, a second inorganic insulation-layer covers the overall surface of the second organic insulation-layer, a surface of the second inorganic insulation-layer being formed planar, and the second coil layer is formed on the planar surface of the second inorganic insulation-layer.

12. A thin-film magnetic head according to claim 11, wherein the first coil layer is formed on a surface of a first inorganic insulation-layer, and the second inorganic insulation-layer is formed such that the distance from the first inorganic insulation-layer to the second inorganic insulation-layer disposed between each winding of the coil conductor of the first coil layer is greater than the distance between each winding of the coil conductor of the first coil layer.

13. A thin-film magnetic head according to claim 11, wherein the second inorganic insulation-layer comprises one of $Al_2O_3$ and $SiO_3$, and the second organic insulation-layer comprises one of a novolak resin and a polyimide resin.

* * * * *

UNITED STATES PATENT AND TRADEMARK OFFICE
CERTIFICATE OF CORRECTION

| | |
|---|---|
| PATENT NO. | : 6,721,130 B2 |
| DATED | : April 13, 2004 |
| INVENTOR(S) | : Kiyoshi Kobayashi et al. |

It is certified that error appears in the above-identified patent and that said Letters Patent is hereby corrected as shown below:

<u>Column 17,</u>
Line 19, delete "layer," and substitute -- layer; -- in its place.

Signed and Sealed this

Twenty-third Day of November, 2004

JON W. DUDAS
*Director of the United States Patent and Trademark Office*